(12) United States Patent
O'Toole et al.

(10) Patent No.: US 11,255,411 B2
(45) Date of Patent: Feb. 22, 2022

(54) MECHANISM FOR SECURING DEVICE

(71) Applicant: Canon Virginia, Inc., Newport News, VA (US)

(72) Inventors: Paxton O'Toole, Chapel Hill, NC (US); Ralph C. McCann, III, Williamsburg, VA (US)

(73) Assignee: Canon Virginia, Inc., Newport News, VA (US)

( * ) Notice: Subject to any disclaimer, the term of this patent is extended or adjusted under 35 U.S.C. 154(b) by 283 days.

(21) Appl. No.: 16/352,628

(22) Filed: Mar. 13, 2019

(65) Prior Publication Data
US 2019/0285139 A1    Sep. 19, 2019

Related U.S. Application Data

(60) Provisional application No. 62/788,590, filed on Jan. 4, 2019, provisional application No. 62/642,465, filed on Mar. 13, 2018.

(51) Int. Cl.
| | |
|---|---|
| *H04N 5/225* | (2006.01) |
| *F16G 11/14* | (2006.01) |
| *H04N 1/00* | (2006.01) |
| *H04N 7/18* | (2006.01) |
| *E05C 19/14* | (2006.01) |
| *E05B 15/04* | (2006.01) |
| *F16G 11/02* | (2006.01) |

(52) U.S. Cl.
CPC ........... *F16G 11/143* (2013.01); *E05B 15/04* (2013.01); *E05C 19/14* (2013.01); *F16G 11/025* (2013.01); *H04N 1/0027* (2013.01); *H04N 5/2253* (2013.01); *H04N 7/183* (2013.01); *H04N 2005/2255* (2013.01); *H04N 2201/0084* (2013.01)

(58) Field of Classification Search
CPC .... F16G 11/143; F16G 11/025; F16G 11/101; H04N 1/0027; H04N 5/2253; H04N 7/183; H04N 2201/0084; H04N 2005/2255; H04N 5/772; H04N 5/2252; E05C 19/14; E05B 15/04
See application file for complete search history.

(56) References Cited

U.S. PATENT DOCUMENTS

| | | | |
|---|---|---|---|
| 2015/0132980 A1* | 5/2015 | Suh ........................ | H01R 12/00 439/157 |
| 2016/0261829 A1* | 9/2016 | Olsson ............... | H04N 5/23293 |
| 2017/0146154 A1* | 5/2017 | Tally ........................ | H02G 3/32 |

OTHER PUBLICATIONS

"Video Camera & Conveyor Monitoring System—Inspection Camera for Conveyor Monitoring System" Online video clip [19 seconds] (pp. 1-5 information, in addition to 6 pages of video frames at 2,3,4,5,6, and 7 intervals); cablevey.com/conveyor-monitoring-system-cameras (as of 2017).

* cited by examiner

*Primary Examiner* — Mekonnen D Dagnew
(74) *Attorney, Agent, or Firm* — Canon U.S.A., Inc. IP Division

(57) ABSTRACT

The present application generally relates to attaching a device to a conveyance structure.

11 Claims, 8 Drawing Sheets

MECHANISM FOR SECURING DEVICE

CROSS REFERENCE TO RELATED APPLICATIONS

This application claims the benefit of U.S. Provisional Patent Application No. 62/642,465 filed Mar. 13, 2018 and U.S. Provisional Patent Application No. 62/788,590 filed Jan. 4, 2019, both of which are hereby incorporated by reference herein in their entireties.

BACKGROUND

Field

This application generally relates to attaching a device to a conveyance structure.

Description of Related Art

When monitoring/inspecting by moving the camera through or against objects to be monitored/inspected, attaching the camera to the cable and then moving the cable is a current state-of-the-art method. The monitoring system needs memory to store the captured images or information, and a way to transfer the information from the system.

US2016/0353065 discloses a diagnostic device having a memory card in the camera. If the memory card is in the camera, the user needs to take out the camera from the diagnostic device and then take out the memory card from the camera. In US2016/0353065, the user needs equipment and time to remove the memory card from the device.

A needed feature is a mechanism that enables an easy method to install the monitoring system onto a conveyance structure.

Another needed feature is a design that protects access ports of the monitoring system, such as removable storage media, other information transfer, or power access ports.

SUMMARY

According to aspects of the present disclosure, a monitoring device for attaching a moving unit comprising a main body, a clamp for holding the moving unit with the main body, an insert port for inserting a memory, wherein the position of the clamp against the main body is switchable from at least a first position and a second position, when the clamp is in the first position, the insert port is covered by the main body and the monitoring device holds the moving unit, and when the latch is in the second position, the insert port is exposed so that the memory (or other access ports) can be taken out (or connected) from the insert port.

DETAILED DESCRIPTION OF THE EMBODIMENTS

Exemplary embodiment(s) of the present disclosure will be described in detail below with reference to the accompanying drawings. It is to be noted that the following exemplary embodiment(s) are merely examples for implementing the present disclosure and can be appropriately modified or changed depending on individual constructions and various conditions of apparatuses to which the present disclosure is applied. Thus, the present disclosure is in no way limited to the following exemplary embodiment(s).

Figure 1:
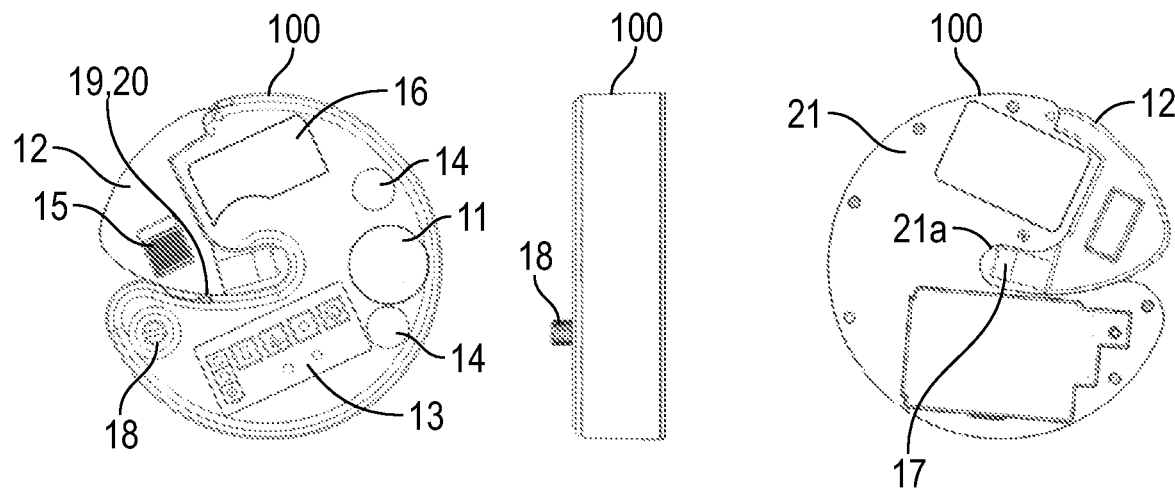
FIG. 1 is an overview of a monitoring device according to an exemplary embodiment.

FIG. 1 is an overview of a monitoring device according to an exemplary embodiment. More specifically, FIG. 1 illustrates top view, bottom view and side view of a monitoring device 100.

The monitoring device 100 is for monitoring/inspecting the inside of a pipe. The pipe is used for conveying materials like animal feeds, chemical substructure, or other materials. If the pipe is used for conveying materials like food or other chemical materials and if other materials other than the material which is supposed to be in the pipe are present, the user may need to stop using the pipe. For example, if the pipe is conveying food and the pipe needs to be cleaned before using the pipe every day, the user need to check if there are no materials in the pipe before putting materials they will next use into the pipe. The pipe can convey materials by moving discs which can convey the materials inside the pipe. The discs are attached to the cable and the discs can move against the pipe by moving the cable.

If there are some materials which the user doesn't want to be in the pipe like dust, insects, or water, the user may need to clean the pipe. The monitoring device 100 can detect such materials by the user checking the captured image/video. Since it is not determined that the monitoring device 100 will be used in the place where a wireless communication network is set up, it is better for the monitoring device 100 to have a memory to which the image will be stored. Especially when the material of the pipe is metal, it is almost impossible to use wireless communication for the monitoring device 100 in the pipe.

Since the user may use the monitoring device 100 multiple times every day, the user needs to take out the memory from the monitoring device 100 and put the memory back to the monitoring device 100 multiple times every day.

It is also important for the user not to use many tools and few operational steps when they take out the memory from the monitoring device 100.

The monitoring device 100 is a device having a camera 11 and a clamp 12. The clamp 12 is a mechanism to clamp the device to a cable. The camera 11 is next to a light 14. The light 14 includes two lights. The cable is in the center of the pipe and there is a possibility that shadows will be caused by the cable if there is a single light. If there are two lights and one is on one side of the camera 11 and the other is on the other side of the camera 11, the possibility that the shadow will appear is reduced. The camera will be able to clearly capture a larger viewing area by having two lights.

A user interface unit 13 includes power button, record start button, wireless button and charge button. The user can control device operations by using the user interface unit 13.

A display unit 16 is a display to show the condition of the monitoring device 100, menu items, time, and so on. The display unit 16 can show memory capacity.

The clamp 12 includes a latch grip 15 and end-effector 17. The latch grip 15 is for disengaging the clamp 12 and from the main body 21 of the monitoring system. The end-effector 17 is for holding the cable with a hole 21a of the main body 21. The hole 21a and the end-effector 17 can clamp/hold the cable when the clamp 12 is in the position of FIG. 1. A latch 19 fits into a latch recess 20.

A screw 18 is for retaining the battery door on the rear of the unit. The screw can be sized/designed such that the head of the screw is flush with the exterior surface of main body 21, to be turned by hand without use of tools.

The clamp 12 will be described later.

FIG. 2 to FIG. 6 illustrate actual pictures of the monitoring device 100.

Figure 2:
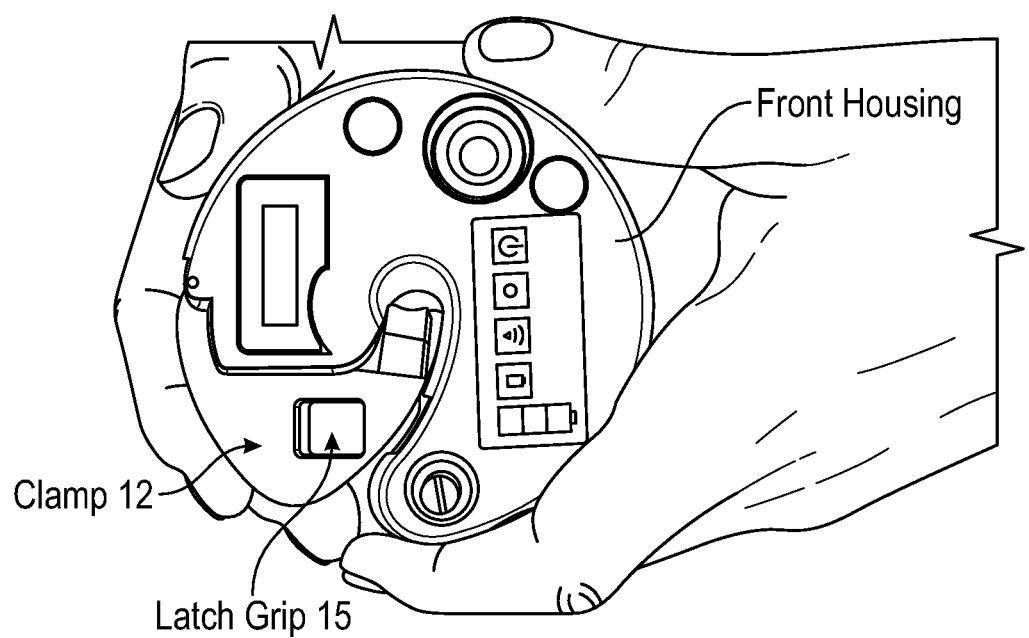
FIG. 2 is a picture of the monitoring device.
Figure 3:
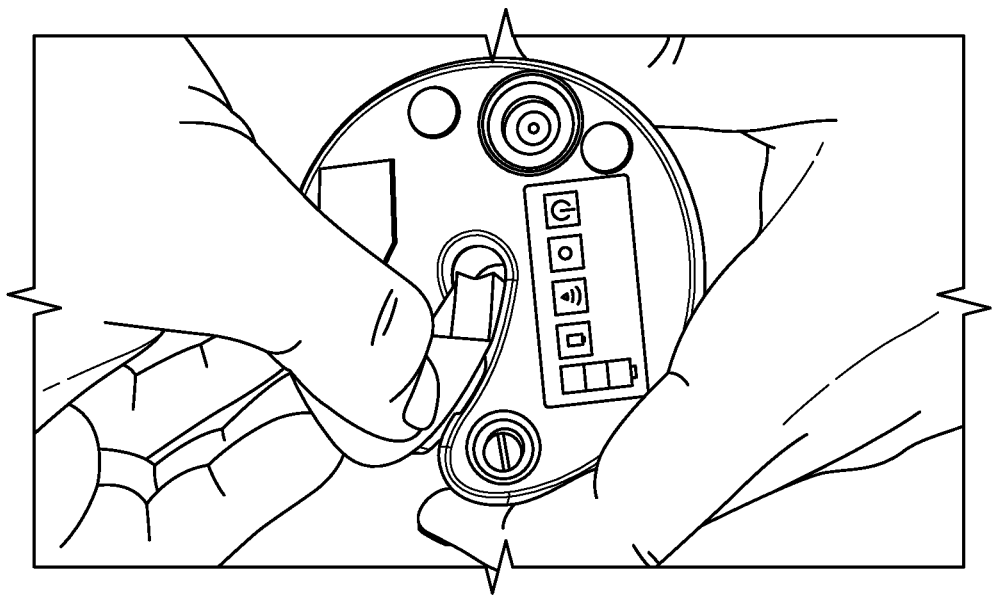
FIG. 3 is a picture of the monitoring device.

To use the monitoring device from a closed and locked position, as illustrated in FIG. 2, the latch 19 can be disengaged by pulling the latch grip 15, as illustrated in FIG. 3. Note that the clamp 12 has disengaged from the main body 21. The clamp 12 is now free to move open. Next, swing the clamp 12 so that the end-effector 17 moves to the further position from the hole 21a, to allow for installation of the monitoring device on the cable. The end-effector 17 moves outward in a radial direction, relative to the hole 21a.

Figure 4:
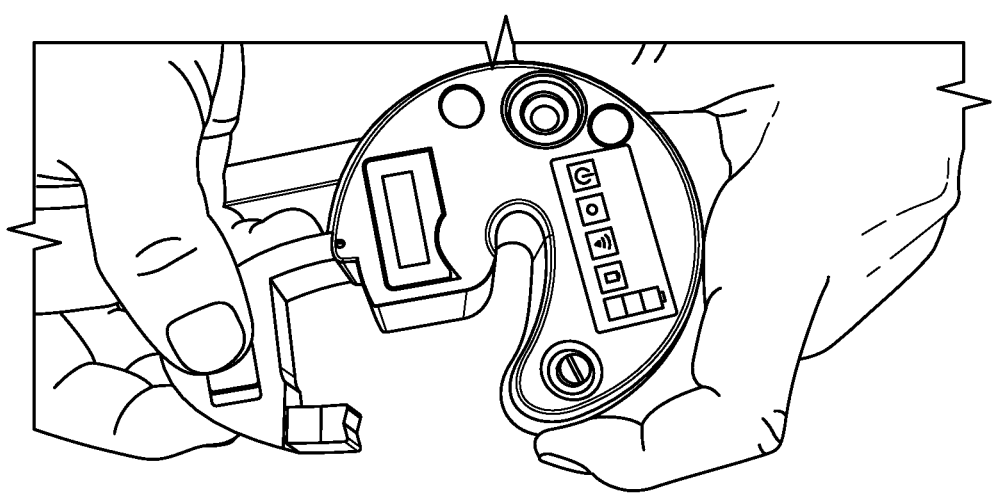
FIG. 4 is a picture of the monitoring device.
Figure 5:
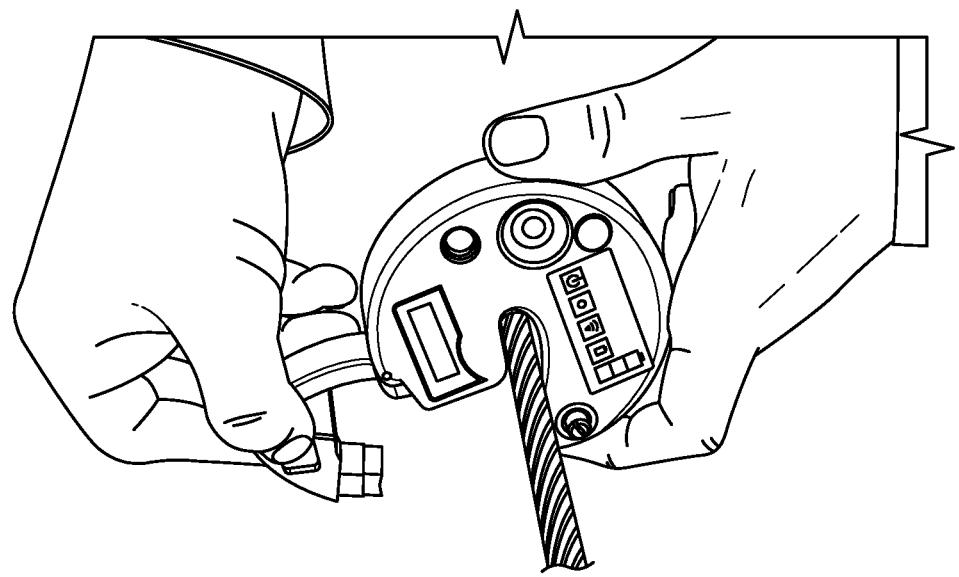
FIG. 5 is a picture of the monitoring device.
Figure 6:
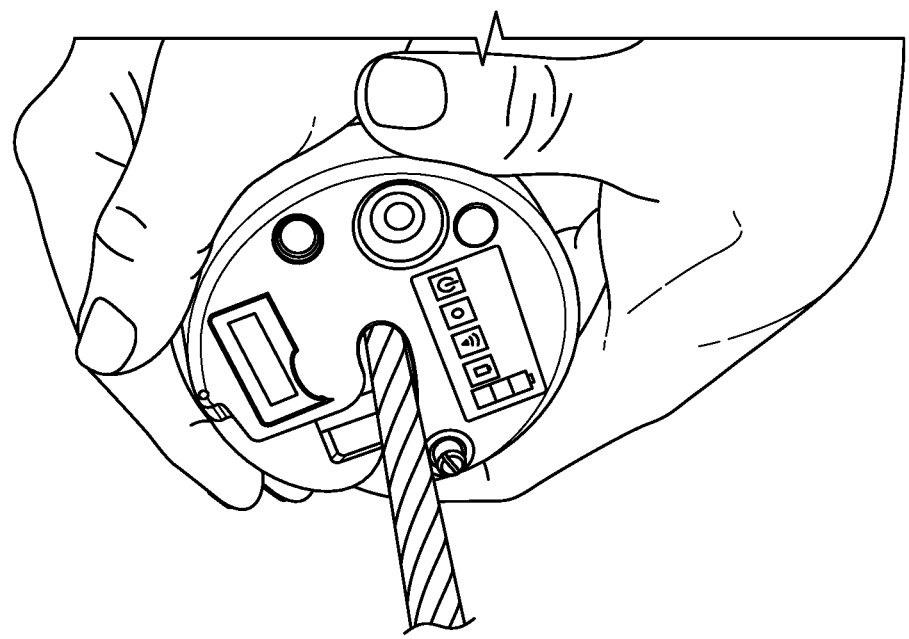
FIG. 6 is a picture of the monitoring device.

The clamp 12 is illustrated in the open position in FIG. 4. Holding the door out of the way, place the unit on the cable, as illustrated in FIG. 5. Now, close the door tightly, allowing the spring-loaded latch 19 to engage. The final engaged position is illustrated in FIG. 6.

By using the clamp 12, the monitoring unit can clamp and release the cable.

Figure 7:
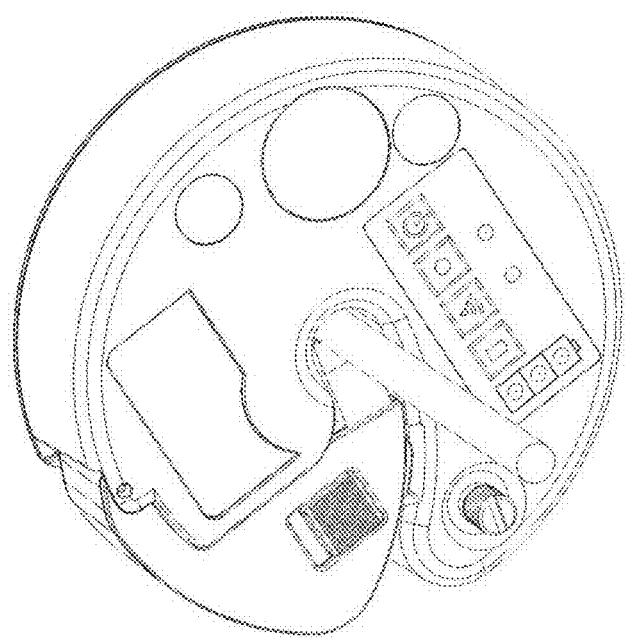
FIG. 7 illustrates a perspective view of the monitoring device.

FIG. 7 illustrates a perspective view when the clamp 12 is closed (first position). When the clamp 12 is closed to hold/clamp the cable, an SD card 23 is covered by the clamp 12. The SD card 23 is illustrated in FIG. 9C.

It is not necessary to seal the SD card 23 completely. If the area where the SD card 23 is inserted and covered by the inside of the clamp 12, it is possible to prevent the area from being exposed to a potentially harsh environment. If there is water remaining in the pipe and the water gets into the SD card 23, the SD card 23 will not be able to continue storing the images. Or if there is dust in the pipe and the dust enters the insert port 22, the SD Card or the entire unit may be damaged, making it impossible to retrieve data.

By covering the insert port 22 by the clamp 12, it can prevent the insert port from being affected by the environment, and protected from impact or other damage.

The monitoring device 100 will travel in the pipe, factory or facility where monitoring is needed.

In the pipe inspection/monitoring, things like feed for people and animals, chemical substances, and dust may be in the pipe when inspected.

Figure 8A:
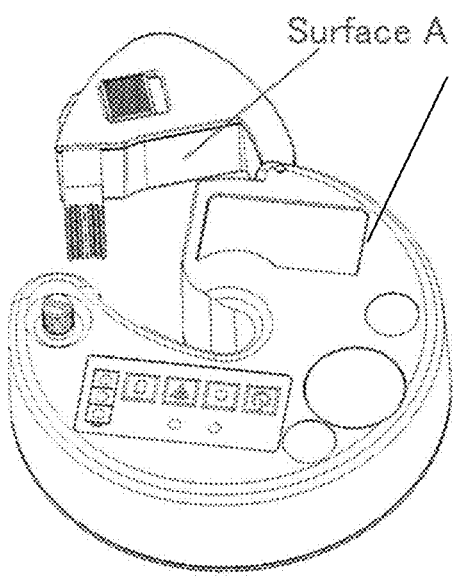
FIG. 8A illustrates a perspective view of the monitoring device.

FIGS. 8A an 8B illustrate perspective view when the latch grip 12 is open (second position). When the latch grip 12 is open, the SD card 23 can be removed from the insert port 22.

Surface A illustrated in FIG. 8A is a surface to cover the insert port 22.

Figure 8B:
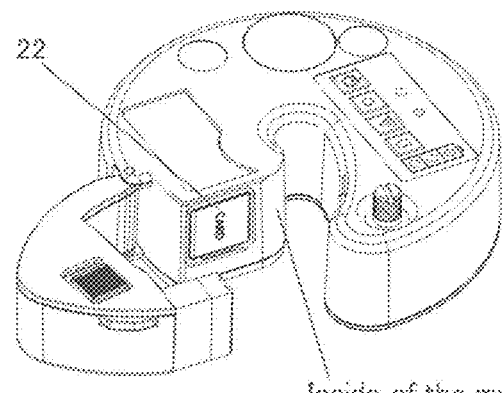
FIG. 8B illustrates a perspective view of the monitoring device.

As illustrated in FIG. 8B the insert port 22 is inside of the main body 21 and is not on the top or bottom of the main body. The user can take out the SD card when the latch grip 12 is open and the inside of the main body 21 is exposed.

The insert port 22 is surrounded by rubber to aid sealing.

Figure 9A:
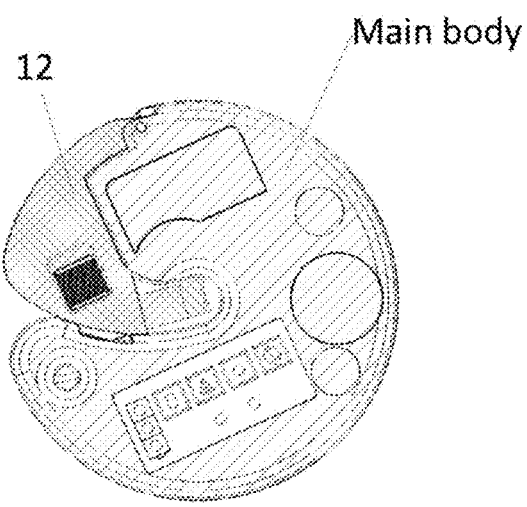
FIG. 9A illustrates a main body and clamp of the monitoring device.
Figure 9B:
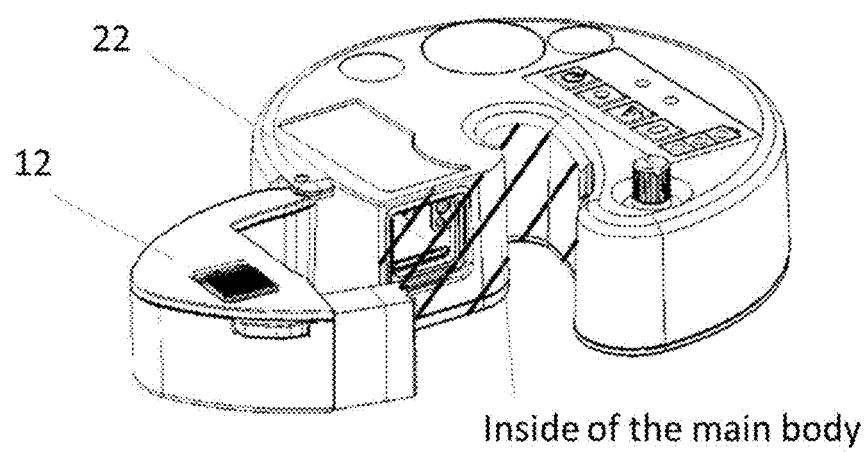
FIG. 9B illustrates a main body and clamp of the monitoring device.
Figure 9C:
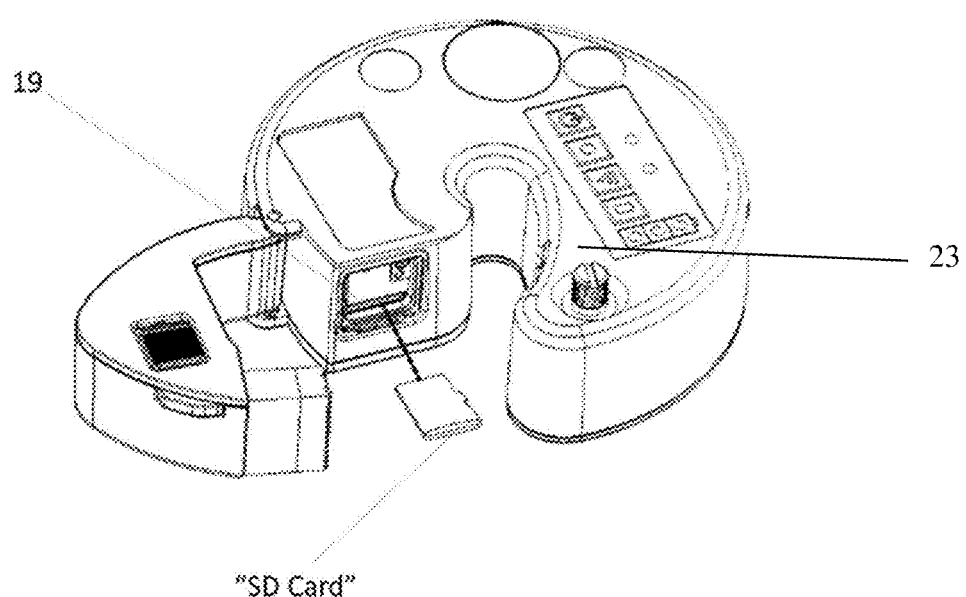
FIG. 9C illustrates a main body and clamp of the monitoring device.

FIGS. 9A, 9BB, and 9C illustrate main body 21 and the clamp 12. The insert port 22 is in the inside area where the main body 21 and the clamp 12 contacted/faced each other.

FIG. 9A illustrates that the clamp 12 is closed (closed position) and the insert port 22 is sealed by the clamp 12.

FIG. 9B illustrates the inside area where the main body 21 and the clamp 12 contacted/faced each other. The insert port 22 is in a position where the user can easily take out the SD card 23 or access other data or access ports (USB, HDMI, power, etc.) As illustrated in FIG. 9B, when the clamp 12 is open (open position), the insert port 22 is in a condition that the SD card can be inserted.

FIG. 9C illustrates how the SD card will be inserted into the insert port 22. As illustrated in FIG. 9C, when the clamp 12 is in the position of FIG. 9C, the SD card can be easily taken out of and inserted into the insert port. When the user operates the monitoring device 100, the user can take out the SD card and import data from the SD card without using equipment for opening the insert port 22. When the user opens the clamp 12 to remove the monitoring device 100 from the cable, the user also can take out the SD card.

And when the user closes the clamp 12 to attach to the cable, the user also can seal the insert port 22 so that dust or other materials will not be in the insert port 22 and the SD card will be protected.

Figure 10:
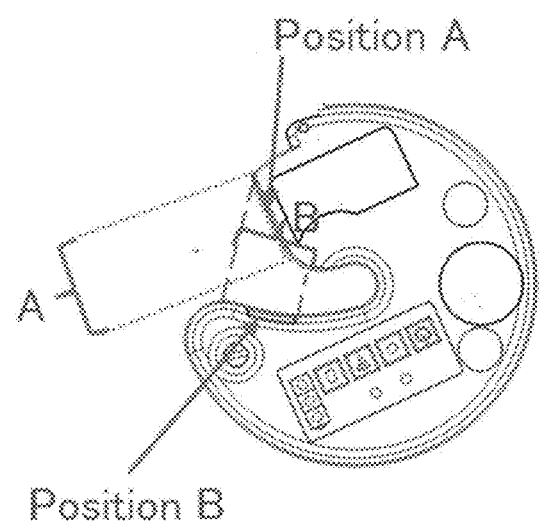
FIG. 10 illustrates an area for removing a storage medium from the monitoring device.

FIG. 10 illustrates an area for taking out the SD card 23 from the insert port 22.

From the inside area, there are plurality of candidates for the position of the insert port 22.

Position A is better than position B for the insert port 22.

As illustrated in FIG. 10, if the insert port 22 is in the position A, a user can access area A for taking out the SD card.

If the insert port 22 is in the position B, the user can access area B for taking out the SD card 23.

Area A is perpendicular area from the plane where the position A is located, and Area B is perpendicular area from the plane where the position B is located.

Comparing area A and B, area B has smaller space to fit fingers for retrieving the SD card. It is easier for the user to operate the SD card when the insert port 22 is in position A. In the case of other external cables or a docking station used to access the internal data, or to charge the unit, position A still offers better access for these purposes.

Aspects of the present disclosure include, but are not limited (1) securing the inspector on the cable, (2) enabling fastening to different cable diameters, and (3) protecting the removable media storage device.

Through testing, the invention indeed secures the inspector to the cable. The clamp secures the unit in such a way that the unit resists both axial and rotary movement. The user provides a clamping force which is transferred from the steel end-effector to the coated or uncoated steel cable. The end-effector should be knurled or otherwise textured to ensure the firmest grip possible.

Through the use of an elastomer, the clamp can accommodate multiple diameters. Specifically, our design was designed to accommodate cable diameters between ¼" and 5/16". Other diameters are possible for this invention. The elastomer had to be designed and selected in such a way that the clamp provides adequate clamping force on the smallest diameter cable (least compression of elastomer means least clamping force), while still allowing the user to close the clamp on the largest diameter (most compression of elastomer means highest applied force).

Figure 11:
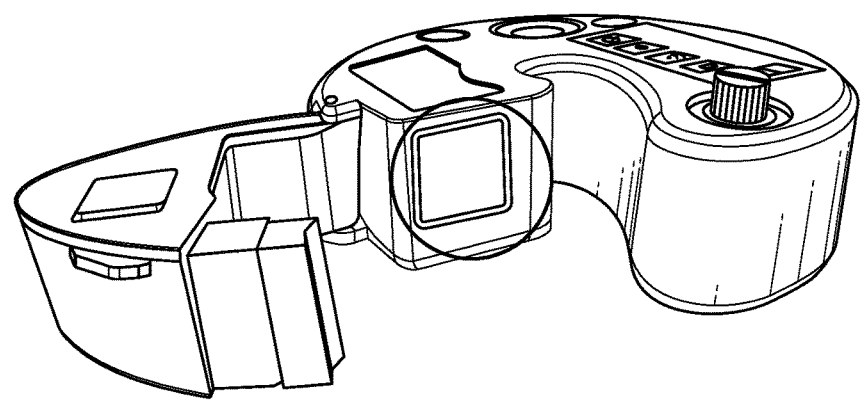
FIG. 11 illustrates an area for storing a storage medium in the monitoring device.
Figure 12:
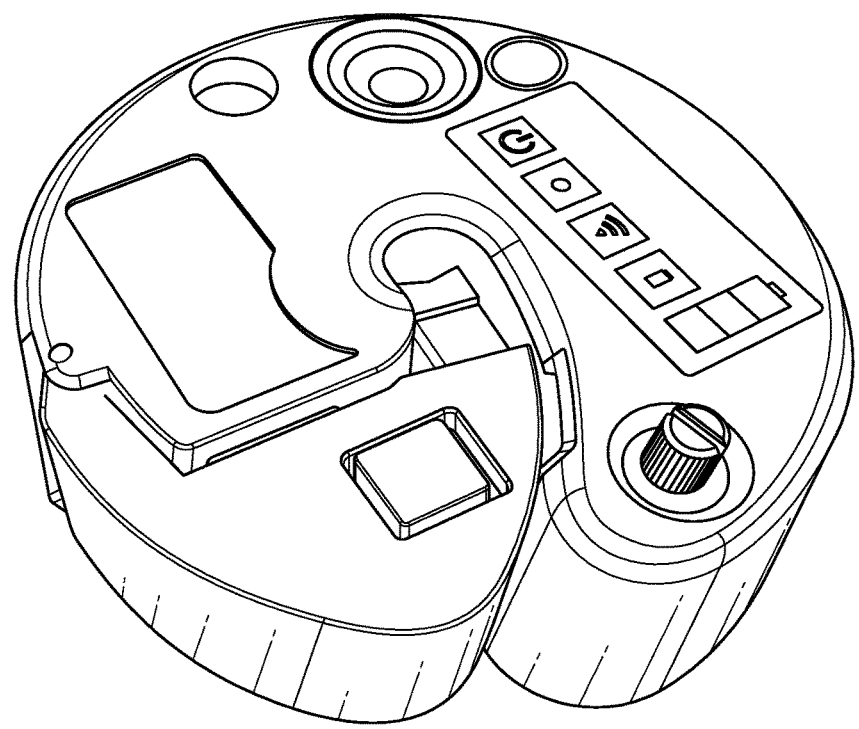
FIG. 12 illustrates an area for storing a storage medium in the monitoring device.

In the design, the removable media storage device was a microSD card. The clamping mechanism protects this SD card by covering the area when closed. The SD card area is illustrated in FIG. 11 with the door open, and in FIG. 12 with the door closed.

As discussed above, the SD card is used for explaining the embodiment. The embodiment is not limited to the SD card but also recording media which are categorized in memory card and USB data or power ports for mating with external cables or docking/charging stations.

And in the above, the camera is used for explaining the embodiment but the embodiment is not limited to the camera but also any recording device can be used for this embodiment. For example, audio recording can be also applied to this embodiment. Not only camera but also a sensor for detecting the material can be applied. If the sensor is used for the monitoring device 100, and when the sensor detects some material at some point, the memory will memorize the position.

As described above, this embodiment can be applied to other devices/apparatuses/methods.

In the above, the cable is used for explaining the embodiment. But the embodiment is not limited to the cable; chain, rope, strip, or rod can be used for the moving the monitoring unit 100 by using the actuator/driving unit. The cable, chain, rope, strip, or rod is one of a moving unit.

In the above, the cable is moved through a metal pipe for explaining the embodiment. But the embodiment is not limited to travelling through a circular cross section metal pipe. The pipe, tube, or vessel can be constructed from a variety of materials and of different cross sectional shapes. And the cable can be drawn through an enclosed space, or an open area to facilitate capturing of images of that space or area.

Advantages of the present disclosure include, but are not limited to, no requirement for tools to attach or detach from a cable, additional protection to the removable media storage device, and a single integrated assembly.

Using the clamping mechanism, the user can more quickly and consistently attach and detach the inspector from the cable. A single integrated assembly enables the user to remove the inspector from the cable without the need to disassemble the assembly each time it is to be removed.
Example: User-Applied Prototype Clamp Testing This testing was carried out after optimizing the geometry and durometer of the rubber used in the clamp. For the latest trial, we used an elastomer with a Shore 30A durometer. The cross section of the clamp's elastomeric part is illustrated below in FIG. 13. Data was obtained by applying a seating force to the clamp via a push/pull analog force gauge. We recorded the force required to fully engage the clamp, and a qualitative note on performance (see Table 1 and Table 2 below). There were two pass/fail constraints for this initial prototype evaluation: (1) did the clamp hold the camera weight when up-turned and shaken? (2) did the clamp hold the unit's radial position (failure criterion: the unit spins freely about the cable)?

These data provided a usable elastomer height range for this particular geometry. With a rough target of applied force around 10 lbs, we saw the only usable option with the given geometry was an elastomer height of 8.5 mm. This can be more finely tuned in a further development effort. Further, we expect that adding a knurl or other gripping texture will increase the effectiveness of the clamp.

Figure 13:
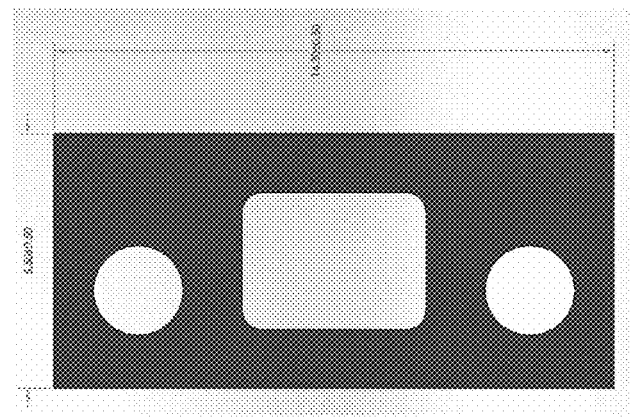
FIG. 13 illustrates a cross sectional view of the clamp.

FIG. 13 illustrates the cross-sectional geometry of the elastomeric spacer used for this trial.

Figure 14:
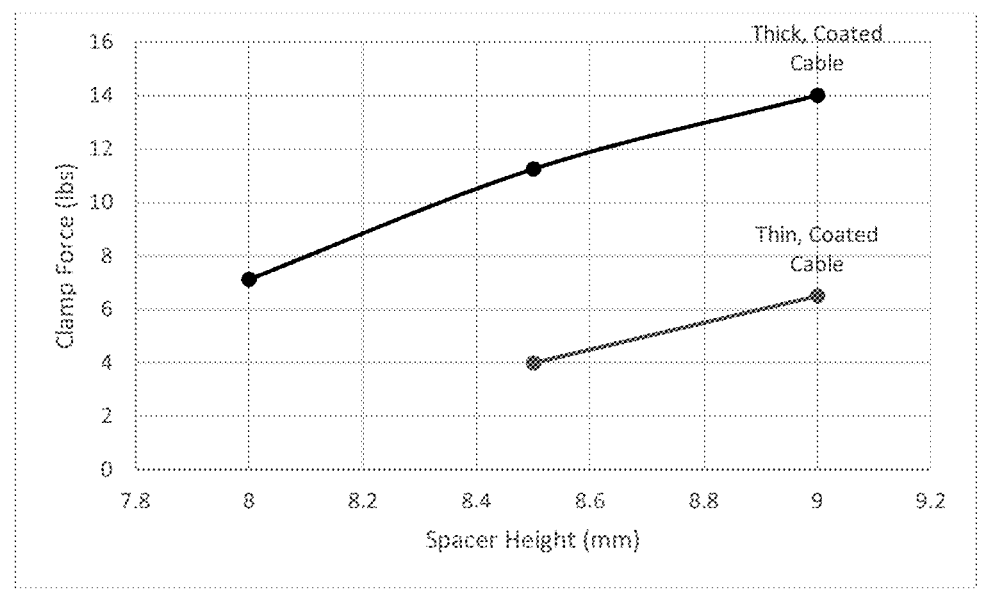
FIG. 14 illustrates a graph of force applied to secure the clamp.

FIG. 14 illustrates a graph of the required applied force to secure clamp on cable, for each the thick and coated cable. Each point represents a different elastomer height.

TABLE 1

Thin, Coated Cable

| Height (mm) mm | Clamp Force (lbs force) | Hold Own Weight? | Rotation Resistance? |
|---|---|---|---|
| 9 | 6.5 | Yes | Yes |
| 9 | 6.5 | Yes | Yes |
| 8.5 | 6.25 | Yes | Yes |
| 8.5 | <4 | Yes | Yes |
| 8.5 | <4 | Yes | Yes |
| 8 | NA | No | No |

TABLE 2

Thick, Coated Cable

| Height (mm) | Clamp Force (lbs force) | Hold Own Weight? | Rotation Resistance? |
|---|---|---|---|
| 9 | 14 | Yes | Yes |
| 9 | 14 | Yes | Yes |
| 8.5 | 11.25 | Yes | Yes |
| 8.5 | 11.75 | Yes | Yes |
| 8 | 7.25 | Yes | Yes |
| 8 | 7 | Yes | Yes |

What is claimed is:

1. A monitoring device for attaching to a moving unit moveable inside a pipe, comprising:
   a main body;
   a clamp for securing the moving unit to the main body, the clamp having a latch configured to latch to the main body; and
   an access port,
   wherein a position of the clamp against the main body is switchable between at least a first position and a second position,
   wherein when the clamp is in the first position, the access port is covered by the clamp and the clamp is latched to the main body via the latch so that the monitoring device is attached to the moving unit, and
   wherein when the clamp is in the second position, the access port is exposed.

2. The recording device according to claim 1, further comprising a hardened, knurled, or textured end-effector to provide resistance to radial and axial movement along the conveyance structure.

3. A recording device that clamps onto a conveyance structure moveable inside a pipe, comprising:
   a housing having an access port; and
   a clamp having a closed position and configured to latch to the housing in the closed position,
   wherein in the closed position, the clamp secures the recording device to the conveyance structure, and
   wherein the clamp provides protection for the access port when the clamp is in the closed position.

4. The recording device according to claim 3, wherein the clamp latches using a spring pin or a ball detent.

5. The recording device according to claim 3, wherein the clamp latches using a draw latch.

6. The recording device according to claim 3, wherein the clamp latches using an elastomeric latch.

7. The recording device according to claim 3, wherein the clamp latches using an integrated sprung or flexible member on the clamp that mates to a slot or recess in the housing.

8. The recording device according to claim 3, further comprising a mechanism on a clamping end of the clamp that enables accommodating different conveyance structure diameters.

9. The recording device according to device claim 8, wherein the mechanism is an elastomer.

10. The recording device according to device claim 8, wherein the mechanism is a deformable end-effector.

11. The recording device according to device claim 8, wherein the mechanism uses a spring or other flexible design.

* * * * *